P. C. KETTERER.
HORSESHOE.
APPLICATION FILED FEB. 20, 1912.
1,040,958.
Patented Oct. 8, 1912.
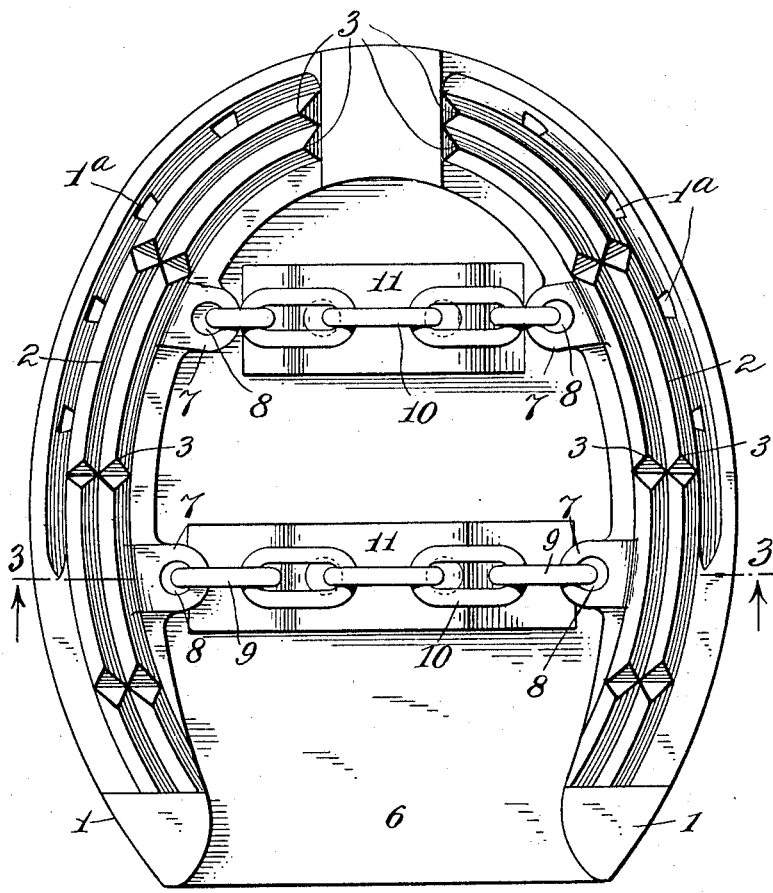
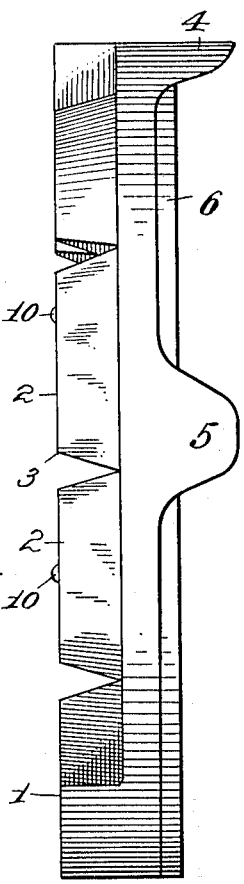
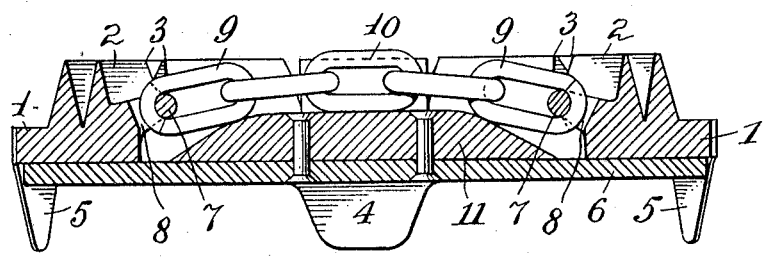
Attest:
Inventor:
Percival C. Ketterer
by Redding & Greeley
Att'ys.

UNITED STATES PATENT OFFICE.

PERCIVAL C. KETTERER, OF NEW YORK, N. Y.

HORSESHOE.

1,040,958.  Specification of Letters Patent.  Patented Oct. 8, 1912.

Application filed February 20, 1912. Serial No. 678,902.

*To all whom it may concern:*

Be it known that I, PERCIVAL C. KETTERER, a citizen of the United States, residing in New York city, New York county, State of New York, have invented certain new and useful Improvements in Horseshoes, of which the following is a specification, reference being had to the accompanying drawings, which form a part hereof.

The object of this invention is to provide a horse-shoe of simple structure which will effectively prevent horses from slipping on wet or icy pavements.

A further object is to attach anti-slipping devices to the horse-shoe in such a way that a maximum gripping surface is presented while the wear on the devices is minimized.

These and other objects will appear more fully hereinafter, reference now being had to the accompanying drawings in which is illustrated one practical embodiment of the invention and in which—

Figure 1 is an underside view of a shoe illustrating the invention. Fig. 2 is a side elevation of the same. Fig. 3 is a view in section on the plane indicated by the line 3—3 in Fig. 1.

The shoe 1 is preferably drop forged and has a double series of V-shaped integral calks or ribs 2, spaced to leave biting points 3. These ribs follow the general contour of the shoe and in themselves are adapted to prevent slipping in longitudinal and transverse directions with respect thereto. On the upper side of the shoe the usual toe-clip 4 and lugs 5—5 are formed to engage the hoof, while interposed between the bottom of the hoof and the shoe is a pad 6 of suitable material such as leather, to cushion the hoof and protect the same from foreign particles. The shoe may be fastened to the hoof in the usual manner, as by nails 1ª.

Interiorly of the shoe, lugs 7 are forged having eyes 8 to receive the terminal links 9 of chains 10 which extend transversely to the sides of the shoe and serve as additional anti-slipping devices. These chains may be fastened to the lugs in any desired manner. As indicated in Fig. 3 the terminal links are split to permit the introduction of the ends in the eyes 8 after which these ends may be pinched together.

The chains 10 are of such a length as to permit the middle link or links to be held in contact with the surface of the pavement or the like. Constant contact is assured by disposing bearing pads or lifts 11 of suitable material between the chains and the hoof pad 6. These lifts are preferably made of leather and may be attached to the hoof pad 6 by rivets or any other approved means.

By using a chain having an odd number of links the mid-link may be caused to normally assume a position in a plane at right angles to that of the shoe. Thus, when this link comes in contact with the pavement it is forced out of this position and turns the adjacent links so that they also bear on the pavement. This twisted chain formation has proven to be most effective in preventing slipping.

In addition to holding the chains in operative position, the bearing pads 11, if resilient, act as shock absorbers, and tend to minimize the wear on the links.

I claim as my invention:—

1. A drop forged horse-shoe having series of spaced V-shaped calks formed on its under surface, chains extending across the shoe and disposed wholly between the inner faces thereof, and means to hold said chains in contact with the pavement.

2. A horse-shoe having a chain extended across the same and disposed wholly between the inner faces thereof, a pad on the top of said shoe and means carried by said pad to hold the chain in contact with the road surface.

3. A horse-shoe having a chain extended across and disposed wholly between its inner faces, a pad on the top thereof, said pad having an enlarged portion to bear against the chain and hold it in contact with the road surface.

4. A horse-shoe having a chain extended across and disposed wholly between its inner faces, and means integral with said shoe to carry the chain.

5. A horse-shoe having a chain extended across and between its inner faces and permanently secured thereto.

This specification signed and witnessed this 16th day of February A. D., 1912.

PERCIVAL C. KETTERER.

Signed in the presence of—
W. B. GURLEY,
WORTHINGTON CAMPBELL.

---

Copies of this patent may be obtained for five cents each, by addressing the "Commissioner of Patents, Washington, D. C."